United States Patent
Foner

(10) Patent No.: US 11,435,018 B2
(45) Date of Patent: Sep. 6, 2022

(54) HYDRAULIC MULTI-COUPLING WITH INDEPENDENT SINGLE HANDLE ROTATIONAL DISCONNECT

(71) Applicant: PARKER-HANNIFIN CORPORATION, Cleveland, OH (US)

(72) Inventor: Brian K. Foner, St. Louis Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 128 days.

(21) Appl. No.: 16/979,293

(22) PCT Filed: Apr. 22, 2019

(86) PCT No.: PCT/US2019/028456
§ 371 (c)(1),
(2) Date: Sep. 9, 2020

(87) PCT Pub. No.: WO2019/221876
PCT Pub. Date: Nov. 21, 2019

(65) Prior Publication Data
US 2020/0400257 A1    Dec. 24, 2020

Related U.S. Application Data

(60) Provisional application No. 62/672,669, filed on May 17, 2018.

(51) Int. Cl.
*F16L 37/00* (2006.01)
*F16L 37/56* (2006.01)
*A01B 76/00* (2006.01)

(52) U.S. Cl.
CPC ............. *F16L 37/002* (2013.01); *F16L 37/56* (2013.01); *A01B 76/00* (2013.01)

(58) Field of Classification Search
CPC ........ F16L 37/002; F16L 37/56; A01B 76/00; A01B 59/043; E02F 9/2275; E02F 3/3654
See application file for complete search history.

(56) References Cited

U.S. PATENT DOCUMENTS 3,710,823 A * 1/1973 Vik ................... F16K 31/52425
285/124.1
3,881,514 A * 5/1975 Berg ....................... F16L 37/56
137/614.04

(Continued)

FOREIGN PATENT DOCUMENTS

| DE | 10 2015 202916 | 8/2016 | |
| EP | 621430 A2 * | 10/1994 | ............ E02F 3/3654 |
| WO | 2015/067793 | 5/2015 | |

OTHER PUBLICATIONS

International Search Report and Written Opinion for corresponding International Patent Application No. PCT/US2019/028456 dated Aug. 1, 2019.

*Primary Examiner* — James M Hewitt, II
(74) *Attorney, Agent, or Firm* — Renner, Otto, Boisselle & Sklar, LLP

(57) ABSTRACT

A multi-coupling assembly includes a first female coupler and a second female coupler whereby the female couplers are independently operable. Rotation of a rotational lever moves one of the female couplers from the coupling position to the release position without affecting a connection state of the other of the female couplers. Such independent operation of the female couplers is achieved by rotating cams that are configured such that when one of the cams rotates to interact against its respective female coupler, the other of the cams does not act on its respective female coupler. Pressure relief valves are operated such that internal pressure within a female coupler is released prior to the female coupler reaching the release position during a disconnection opera- (Continued)

tion of the male coupler, and prior to the female coupler reaching the coupling position during a connection operation of a male coupler.

12 Claims, 9 Drawing Sheets

(56) References Cited

U.S. PATENT DOCUMENTS

| | | | |
|---|---|---|---|
| 5,342,098 A * | 8/1994 | Wilkins | F16L 37/56 285/309 |
| 7,568,502 B2 | 8/2009 | Marquis | |
| 2016/0281895 A1 | 9/2016 | Allevi et al. | |
| 2016/0290542 A1 | 10/2016 | Gatti et al. | |

* cited by examiner

HYDRAULIC MULTI-COUPLING WITH INDEPENDENT SINGLE HANDLE ROTATIONAL DISCONNECT

RELATED APPLICATIONS

This application is a national phase of International Application No. PCT/US2019/028456 filed Apr. 22, 2019, which claims the benefit of U.S. Provisional Application No. 62/672,669 filed on May 17, 2018, the contents of which are incorporated herein by reference.

FIELD OF INVENTION

The present invention relates generally to quick couplings, and more particularly to multi-couplings for connecting multiple fluid lines in high pressure and other fluid systems, such as hydraulic fluid systems.

BACKGROUND OF THE INVENTION

Quick couplings in general are common devices for coupling fluid lines without the need for special tools. Quick couplings, for example, may be configured as individual couplings for the connection of a single fluid line. An exemplary use of quick couplings is in the connection of hydraulic fluid lines in hydraulic systems. Individual quick couplings typically have a ball locking mechanism to hold two halves of the coupling together as they try to separate from internal pressures. Quick couplings may be combined together to be configured as a multi-coupling for connecting any number of multiple fluid lines. A multi-coupling constitutes a group of quick couplings mounted together in a plate or casting. In place of an individual locking mechanism for each individual coupling, a multi-coupling typically has a multi-line connection and locking mechanism that connects and holds the group of individual couplings together. The mechanical advantage of this single multi-line connection and locking mechanism is often beneficial to overcome the combined forces required to connect all of the quick couplings simultaneously.

In one example configuration particularly suitable for certain types of vehicle equipment, such as for example compact farm tractors and the like, a multi-coupling can comprise a block housing and a pair of female couplers positioned within respective bores of the housing so that, when male couplers are coupled thereto, a flow path will be established between the male couplers and the supply/return lines of a fluid system. A female coupler can be movable between a connected position operable for fluid flow and a release position for disconnection of the male coupler. In the connected position, a male coupler coupled to the female coupler will communicate with the supply or return line of the fluid system assembly. In the release position, a male coupler can be released or "uncoupled" from the female coupler.

Cam members are commonly used to move the female coupler(s) from the connected position to the release position. In a multi-coupling having a pair of female couplers, a lever can be provided to move the cam members to cause corresponding movement of the female couplers. In one known lever design, movement (i.e., rotation) of the lever's shaft results in parallel movement of the cam members and simultaneous interaction with the female couplers. In another known lever design, movement (i.e., pivoting) of the lever's shaft results in a see-saw movement of the cam members and independent interaction with the female couplers.

As referenced above, one exemplary use of a multi-coupling mechanism is with certain vehicle equipment, such as for example compact farm tractors and similar equipment or vehicles. Push-Pull Farm Couplings and Lever Operated Farm Couplings in both ISO 7241 and ISO 16028 are becoming common in agricultural applications. By common industry standards, all the couplings in the multi-coupling are non-spill couplers meaning there is only a small amount of spillage upon disconnect. This style of coupling also has a flush faced design, which is preferred in applications in which there may be substantial debris. If any debris gets on the face of the coupling, the debris can be wiped off and does not get ingested into the hydraulic system.

Accordingly, when uncoupling a male coupler from a female coupler, it is desirable to release pressure build-up within the female coupler prior to actual disconnection of the male coupler. This has been accomplished by the coupling incorporating, for each female coupler, a pressure relief valve movable from a closed position to an open position to prevent or permit the release of pressure from a flow passage inside the female coupler. With both the rotational lever design and the see-saw lever design, this can be accomplished by the cam member pushing a plunger of the pressure relief valve to the open position when the female coupler is moving towards the release position. It is also often desirable to release pressure build-up within the female coupler prior to coupling of the male coupler.

One problem with the conventional lever operated couplings was developing a way to connect under both female and male pressure by pushing in the male coupler, and also disconnecting under pressure either by pulling or by operation of a lever to disconnect the couplings. Conventional rotational lever designs, therefore, had proven deficient. In an alternative design, operation of a push-pull or see-saw lever was used but without the ability of the connection to auto-relieve the pressure during the connection operation. An improvement using the see-saw design is described in U.S. Pat. No. 7,568,502 (Marquis. Issued Aug. 4, 2009). The Marquis design enhanced the ability to disconnect couplings using a push-pull handle using a see-saw lever. One known problem with this see-saw style lever is using the couplings in a horizontal mounting position in a location with minimal clearance. The push-pull, see-saw lever requires more room to operate, and the space typically cannot be increased due to other equipment structures and movable elements.

SUMMARY OF THE INVENTION

The present disclosure pertains to an enhanced multi-coupling assembly for a multi-line connection having multiple individual quick couplings, that allows for independent disconnection of a male coupler when the female couplers are used in a plural mounted housing assembly. Embodiments of the present disclosure provide a lever operated multi-coupling that is able to connect with both female and male pressure, and is able to independently disconnect the male coupler using a single rotational lever having an axis of rotation that is perpendicular to an axis of the female couplers and extends parallel to a plane created by the axes of the female couplers. Accordingly, the present disclosure achieves the advantages of the Marquis see-saw design using a more compact configuration that utilizes a single rotational lever.

Independent coupling release is gaining interest in the off-highway vehicle market due to the development of the Marquis see-saw push-pull lever design. It is recognized that developments are needed to improve the operator interface, and independent coupling release is one feature that is highly desired. Another feature that is desired is a rotational lever operation instead of the see-saw lever due to coupling installation positions. For instance, when a multi-coupling assembly is installed in a near horizontal (or vertical) orientation, the access to the see-saw lever movement becomes difficult and the advantages of a rotational lever become realized.

The multi-coupling according to this disclosure makes it possible to use one rotational lever to move the female coupling cartridges to independent release positions, in a manner that releases any residual pressure in the female coupling cartridges. This is accomplished by using a rotational shaft, cams, and stop member cups in a construction that allows for release of the internal pressure prior to moving the female coupling cartridges to the release position. Previous designs did not realize the ability to use a rotational cam for independent coupling release with a lever operated design. The multi-coupling also has a feature that allows for connection with residual pressure on the female coupling cartridge by providing for release of the residual pressure during the connection process. A pressure relief valve is moved to the open position by the cup during the connection sequence, and the cup can either be stopped at the correct position on the lever cams or on the housing. The cups also act acts as a stop for the respective female coupling cartridge. This prevents excessive movement of the female coupling cartridge in the rearward direction internally into the housing. This stop feature prevents the coupling body surrounding the pressure relief valve from contacting and creating damage to the cup.

The multi-coupling provides for independent coupling release, whereby an axis of rotation of the rotational lever is perpendicular to an axis of the first and second female couplers, and the rotational lever extends parallel to a plane created by the two axes of the first and second female couplers. Previous couplings were either dependent coupling release mechanisms with the lever perpendicular to the axis of the couplings and parallel to a plane created by the two axes of the couplings, or they were independent using a lever perpendicular to the axis and using a see-saw lever which may be unsuitable for certain vehicle configurations.

As aspect of the invention, therefore, is an enhanced multi-coupling assembly for a multi-line connection having multiple individual quick couplings, that allows for independent disconnection of a male coupler when the female couplers are used in a plural mounted housing assembly. In exemplary embodiments, a multi-coupling assembly includes a housing, and a first female coupler and a second female coupler that are housed within the housing. Each of the first female coupler and the second female coupler are moveable between a coupling position in which a female coupler is connectable to a respective male coupler to permit a flow of fluid through the multi-coupling assembly, and a release position in which the male coupler is releasable from a respective female coupler. A rotational lever has a handle portion that is external from the housing and a shaft portion that extends from the handle portion into the housing. Rotation of the rotational lever moves one of the female couplers from the coupling position to the release position without affecting a connection state of the other of the female couplers.

Such independent operation of the female couplers is achieved by rotating cams that are configured such that when one of the cams rotates to interact against its respective female coupler, the other of the cams does not rotate or rotates away from its respective female coupler. Pressure relief valves are operated such that internal pressure within a female coupler is released prior to the female coupler reaching the release position during a disconnection operation of the male coupler, and prior to the female coupler reaching the coupling position during a connection operation of a male coupler.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
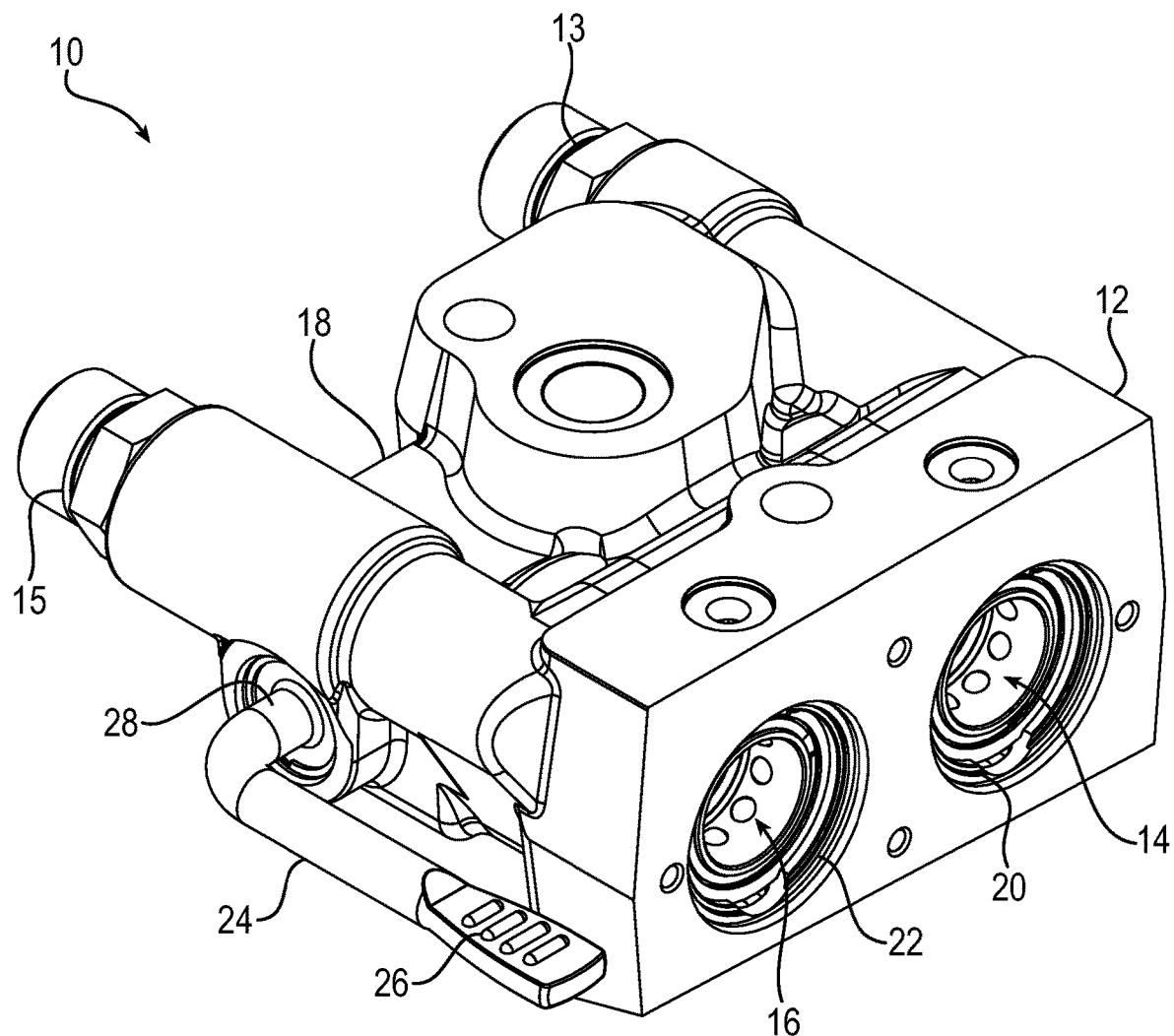
FIG. 1 is a drawing depicting a perspective view of an exemplary multi-coupling assembly in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting a perspective view of an exemplary multi-coupling assembly 10 in accordance with embodiments of the present invention. Generally, the multi-coupling assembly 10 includes a plurality of female coupling cartridges that are installed into a block housing or casting 12. As is typical of vehicles usages, the plurality of female coupling cartridges includes two such cartridges, including specifically a first female coupler 14 and a second female coupler 16. The female couplers are connected to respective first and second fluid lines 13 and 15 for the communication of fluid to and from other parts of the hydraulic fluid system. In operation, one of the fluid lines may act as a fluid supply line and the other of the fluid lines may act as a return fluid line. The female couplers further may be in fluid communication with a sump via an end 18 of the multi-coupling assembly 10, as further detailed below.

The female couplers 14 and 16 are connected to male couplers for the completion of a hydraulic fluid flow path. The female couplers respectively are located within the housing 12 within respective stepped bores 20 and 22. The female couplers are moveable within the stepped bores between a first position in which the female couplers are connectable to the male couplers for fluid flow through the system (also referred to herein as the coupling position), and a second position in which the female couplers are in a state that permits releasing a male coupler from a female coupler (also referred to herein as the release position). The female couplers are moved from the coupling position to the release position by operation of a rotational lever 24. The rotational lever 24 has a handle portion 26 that is operable by a user to rotate the rotational lever, and a shaft portion 28 that extends into the housing 12 in a manner configured to interact with the female couplers, as further detailed below. The handle portion 26 and the shaft portion 28 are perpendicular to each other to provide adequate mechanical advantage for operation of the multi-coupling assembly 10, while maintaining a compact footprint.

As further detailed below, the rotational lever 24 of the multi-coupling assembly 10 is operable to independently disconnect a male coupler from a female coupler when the female couplers are used in a plural mounted housing assembly. In other words, a male coupler may be disconnected from one of the female couplers while the other female coupler remains in the connected state with another male coupler. In addition, pressure build-up within the female coupler that is being disconnected is released when the female coupler is moved toward the release position, prior to the actual removal of the male coupler. This is accomplished by the multi-coupling assembly incorporating, for each female coupler, a pressure relief valve movable from a closed position to an open position by operation of the rotational lever 24 to prevent pressure build-up or permit the release of pressure from the flow passage through the female coupler during a disconnection operation. Likewise, pressure build-up within the female coupler also is released during the connection process when the male coupler is being connected to the female coupler.

As aspect of the invention, therefore, is an enhanced multi-coupling assembly for a multi-line connection having multiple individual quick couplings, that allows for independent disconnection of a male coupler when the female couplers are used in a plural mounted housing assembly. In exemplary embodiments, a multi-coupling assembly includes a housing, and a first female coupler and a second female coupler that are housed within the housing. Each of the first female coupler and the second female coupler are moveable between a coupling position in which a female coupler is connectable to a respective male coupler to permit a flow of fluid through the multi-coupling assembly, and a release position in which the male coupler is releasable from a respective female coupler. A rotational lever has a handle portion that is external from the housing and a shaft portion that extends from the handle portion into the housing. Rotation of the rotational lever moves one of the female couplers from the coupling position to the release position without affecting a connection state of the other of the female couplers. Such independent operation of the female couplers is achieved by rotating cams that are configured such that when one of the cams rotates to interact against its respective female coupler, the other of the cams does not rotate or rotates away from its respective female coupler.

Figure 2:
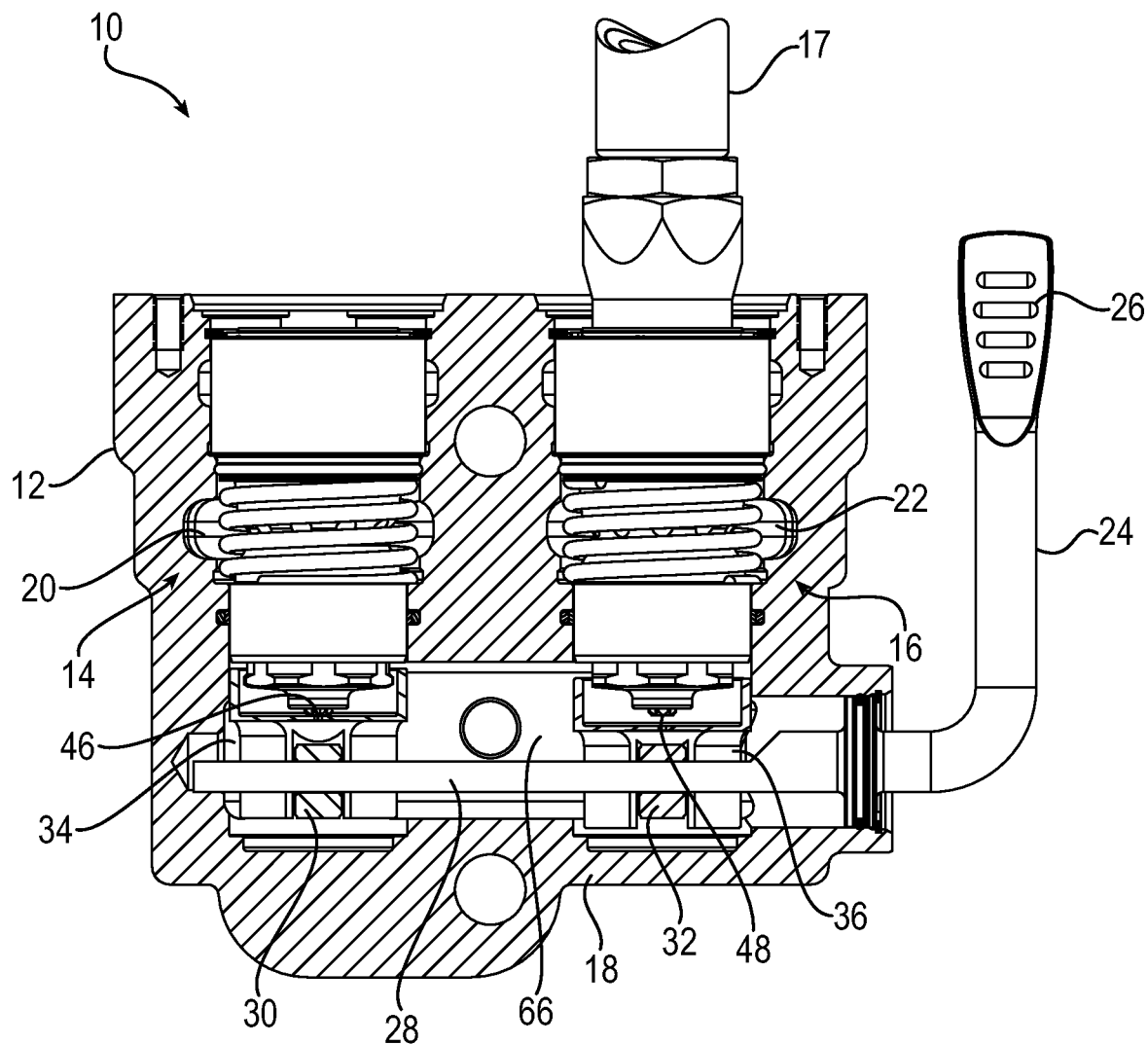
FIG. 2 is a drawing depicting a cross-sectional view of the exemplary multi-coupling assembly of FIG. 1.

To illustrate more detailed operation of the multi-coupling assembly 10, FIG. 2 is a drawing depicting a cross-sectional view of the exemplary multi-coupling assembly 10 of FIG. 1. The multi-coupling assembly 10 includes the plurality of hydraulic female coupling cartridges including the first female coupler 14 and the second female coupler 16 installed into the block housing 12. The housing 12 includes the stepped bores 20 and 22 into which the female couplers are positioned. In this depiction, one of the female couplers (e.g., second female coupler 16) is illustrated as connected to a male coupler 17. FIG. 2 further illustrates the configuration of the rotational lever 24 with the handle portion 26 and shaft portion 28. The cross-sectional view illustrates the manner by which the shaft portion 28 extends through the housing 12, such that operation of the handle portion 26 by a user can rotate the shaft portion 28 from outside of the housing. The rotational lever 24 can be rotated in either a clockwise or counter-clockwise direction, and movement of the rotational lever 24 by using the handle portion 26 results in rotation of the shaft portion 28 in a corresponding clockwise or counter-clockwise direction.

The shaft portion 28 of the rotational lever 24 is connected to a plurality of cams, with one cam being located adjacent to one each of the plurality of female coupling cartridges. In this example having a two-coupler configuration of a first female coupler 14 and a second female coupler 16, the shaft portion 28 is connected to a first cam 30 located adjacent to the first female coupler 14, and a second cam 32 located adjacent to the second female coupler 16. The cams are configured such that each cam interacts with a respective different female coupler at a different rotational position of the rotational lever 24. To achieve such difference, for example, the cams may be of different designs or shapes, or may be of the same design installed at different rotational positions relative to each other along the rotational lever shaft. In the depicted two-coupler configuration, the cams may be positioned 180° relative to each other along the shaft portion 28. The cams may be machined directly onto the rotational lever shaft or could be molded or part of the rotational lever 24. Certain design advantages can be realized by having the cams either integral with or not integral with the rotational lever 24. For example, a compact size design may be allowed by using cam members that are not integral with the rotational lever so that proper sized cams can be fitted onto the rotational lever shaft in the field as may be suitable for a particular application. Alternatively, integral parts can be easier to handle and assemble together within the multi-coupling assembly.

Figure 3:
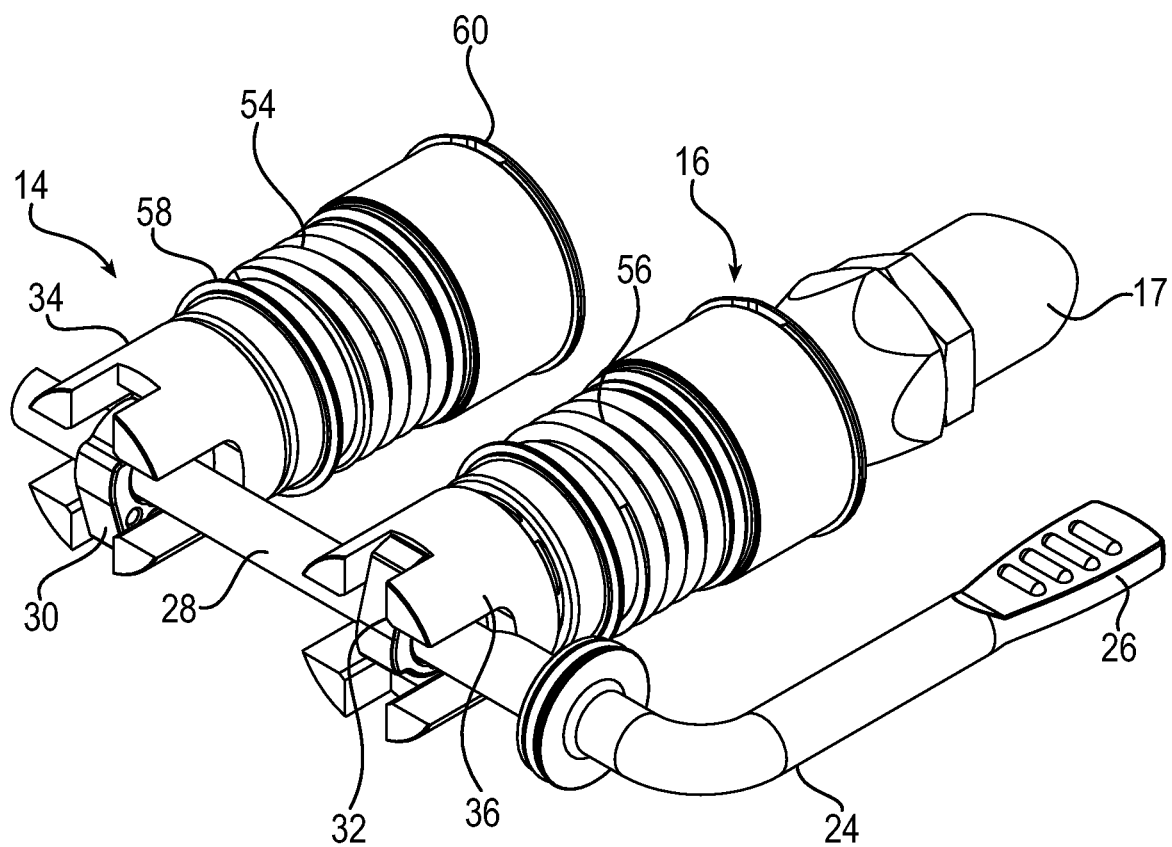
FIG. 3 is a drawing depicting a perspective view of the fluid control portions of the multi-coupling assembly of FIGS. 1 and 2 in isolation.

As further detailed below, the rotational lever 24 can place both cams 30 and 32 in a neutral position, or the rotational lever can move one of the cams in a position to place the respective female cartridge coupling in its release position while the other female coupler remains connected to a male coupler. To further aid illustration of such operation, FIG. 3 is a drawing depicting a perspective view of the fluid control portions of the multi-coupling assembly 10 of FIGS. 1 and 2, with the fluid control portions shown in isolation. Referring together to FIGS. 2 and 3, in this example the cams 30 and 32 are configured to have a common design and are oriented 180° relative to each other along the shaft portion 28. The first cam 30 and second cam 32 are installed onto the shaft portion 28 positioned such that rotation of the rotational lever 24 causes each cam to interact with a stop member of a respective female coupler. In the depicted two-coupler design, the multi-coupling assembly includes a first stop member 34 associated with the first female coupler 14, and a second stop member 36 associated with the second female coupler 16. The stop members also are referred to as cups 34 and 36 due to the manner by which the coupling portions of the female coupling cartridges are received within the respective stopper members to form the completed female coupling cartridges.

Figure 4:
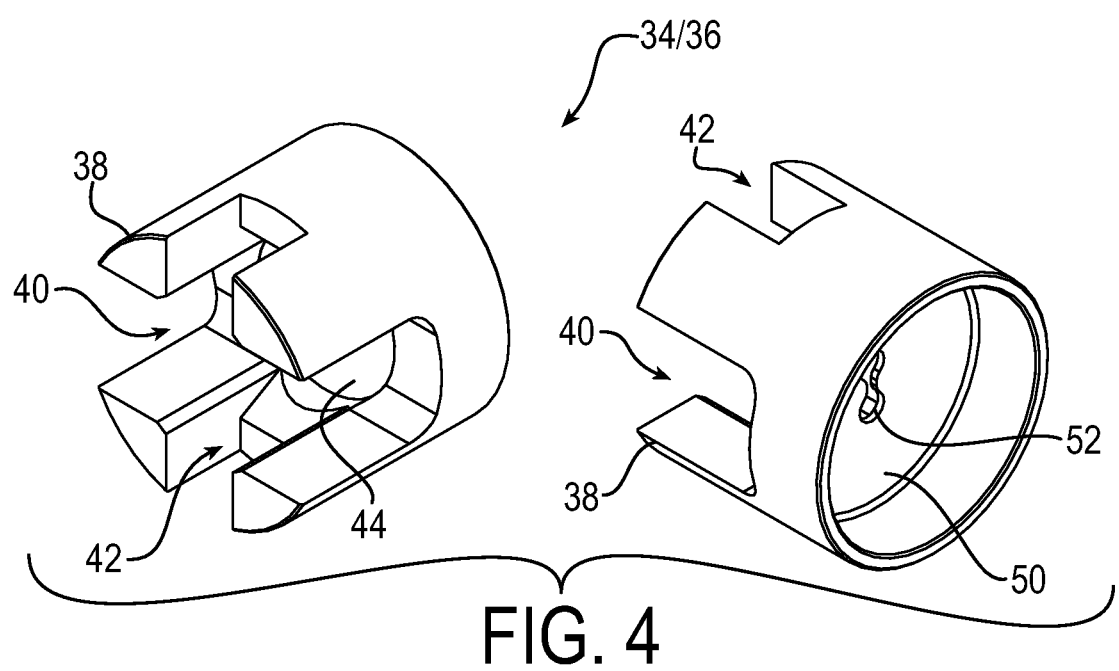
FIG. 4 is a drawing depicting a perspective view of an exemplary stop member/cup of a female coupler in isolation.

FIG. 4 further is a drawing depicting a perspective view an exemplary stop member/cup 34 or 36 in isolation. Referring to FIGS. 3 and 4, each stop member has a plurality of posts 38 that are spaced apart to form perpendicular intersecting first and second slots 40 and 42. The first slot 40 is a shaft slot through which the shaft portion 28 of the rotational lever 24 extends in a rotatable manner. The second slot 42 is a cam slot in which one of the cams is located, which also permits movement of the cams. Each stop member/cup 34 or 36 further includes and inner surface 44 that defines the two slots and against which the cam may interact by rotation of the rotational lever 24. In particular, FIG. 3 illustrates the coupling assembly in a neutral position in which cams 30 and 32 are positioned essentially parallel to the inner surfaces 44 of the respective stop members 34 and 36.

Generally, if a user were to rotate the rotational lever 24 if a first direction such as clockwise, the second cam 32 will interact against the inner surface of the second stop member 36, which moves the second female coupler 16 from the connected position to the release position so that the male coupler 17 can be released. With such clockwise rotation, the first cam 30 rotates away from the inner surface of the first stop member 34, and thus does not interact against the first stop member. Conversely, if a user were to rotate the rotational lever in a second and opposite direction such as counter-clockwise, the first cam 30 will interact against the inner surface of the first stop member 34, which moves the first female coupler from the connected position to the release position so that a male coupler can be released. With such counter-clockwise rotation, the second cam 32 rotates away from the inner surface of the second stop member 36, and thus does not interact against the second stop member. In this manner, one of the female couplers may be placed in the release positioned to disconnect a male coupler, while the other female coupler can remain in a connected position, depending upon the direction of rotation of the rotational lever.

Referring again to FIG. 2 in combination with FIG. 4, the first female coupler 14 includes a first pressure relief valve 46, and the second female coupler 16 includes a second pressure relief valve 48. Generally, the pressure relief valves are operated such that internal pressure within a female coupler is released prior to the female coupler reaching the release position during a disconnection operation of the male coupler, and prior to the female coupler reaching the coupling position during a connection operation of a male coupler. The pressure relief valves may be configured as press-activated valves that include a plunger that may be depressed to open the pressure relief valve. In particular, as the cams interact against the stop members/cups to move such members, surfaces of the stop members/cups may depress the pressure relief valves to release pressure within the female coupler during disconnection and connection operations. For such function, as depicted in FIG. 4, each stop member has a coupler interaction surface 50 that receives the coupler component to form the overall female coupling cartridge. The coupler surface 50 includes a release feature 52 that is configured to conform with the pressure relief valve for operation of the pressure relief valve during disconnection and connection operations.

Accordingly, in the coupling position of the female coupling cartridges, the stop members are spaced apart from respective coupler components so that pressure is maintained and fluid can flow through the stop members to the broader fluid system. The cams interact against the stop members/cups to close that space and operate the pressure relief valves during the disconnection process, as further detailed below. In addition, the cups can either be stopped at the correct position on the lever cams or on the housing. The cups also act acts as a stop for movement of the respective female coupling cartridges. This prevents excessive movement of the female coupling cartridges in the rearward direction internally into the housing. This stop feature prevents the coupling body surrounding the pressure relief valve from contacting and creating damage to the cup.

Referring again to FIG. 3, the first female coupler 14 may include a stepped outer surface 54, and the second female coupler 16 may include a stepped outer surface 56, that are respectively configured to conform to the stepped bores 20 and 22 of the housing 12. The female couplers further may include any appropriate seals 58 and a front locking ring 60 that seal the female couplers relative to the housing, and aid in proper positioning of the female couplers both in the connected position and in the release position.

Figure 5A:
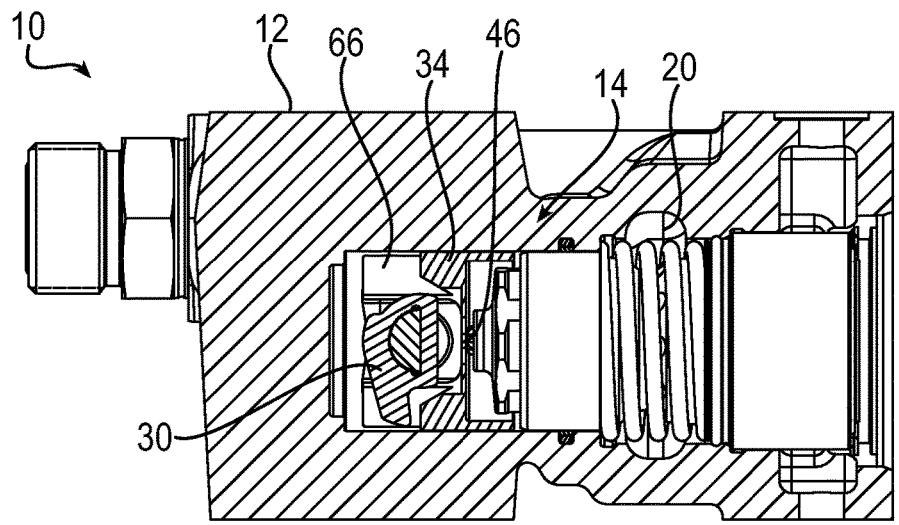
FIG. 5A and FIG. 5B are drawings depicting cross-sectional views of the exemplary multi-coupling assembly in different planes corresponding to a first female coupler and a second female coupler, with the multi-coupling assembly in a first or neutral position.

FIGS. 5A/5B to 8A/8B are drawings depicting cross-sectional views of the exemplary multi-coupling assembly 10 in different planes corresponding to the first female coupler 14 and the second female coupler 16, with the multi-coupling assembly being in different states or positions. As referenced generally above, the different states or positions result from rotation of the rotational lever in a manner that one of the cams acts to move a respective female coupler from the connected position to the release position, while the other cam rotates away from the other female coupler so as not to affect the connection state of said other female coupler. In this manner, an axis of rotation of the rotational lever is perpendicular to an axis of the first and second female couplers, and the rotational lever extends parallel to a plane created by the two axes of the first and second female couplers. Accordingly, the present disclosure achieves the advantages of the Marquis see-saw design using a more compact configuration that utilizes a rotational lever that rotates about a single rotational axis.

Another aspect of the invention, therefore, is method of operating a multi-coupling assembly for independent disconnection of a male coupler when the female couplers are used in a plural mounted housing assembly. In exemplary embodiments, the method includes the steps of providing a multi-coupling assembly according to any of the embodiments, rotating the rotational lever, wherein rotation of the rotational lever moves one of the female couplers from the connected position to the release position without affecting a connection state of the other of the female couplers; and disconnecting a male coupler from a respective female coupler that is in the release position without affecting the connection state of the other of the female couplers. Such independent operation may be achieved by opposite orientations of the referenced cams. In addition, the pressure relief valves are operated such that internal pressure within a female coupler is released prior to the female coupler reaching the release position during a disconnection operation of the male coupler, and prior to the female coupler reaching the connected position during a connection operation of a male coupler.

Figure 5B:
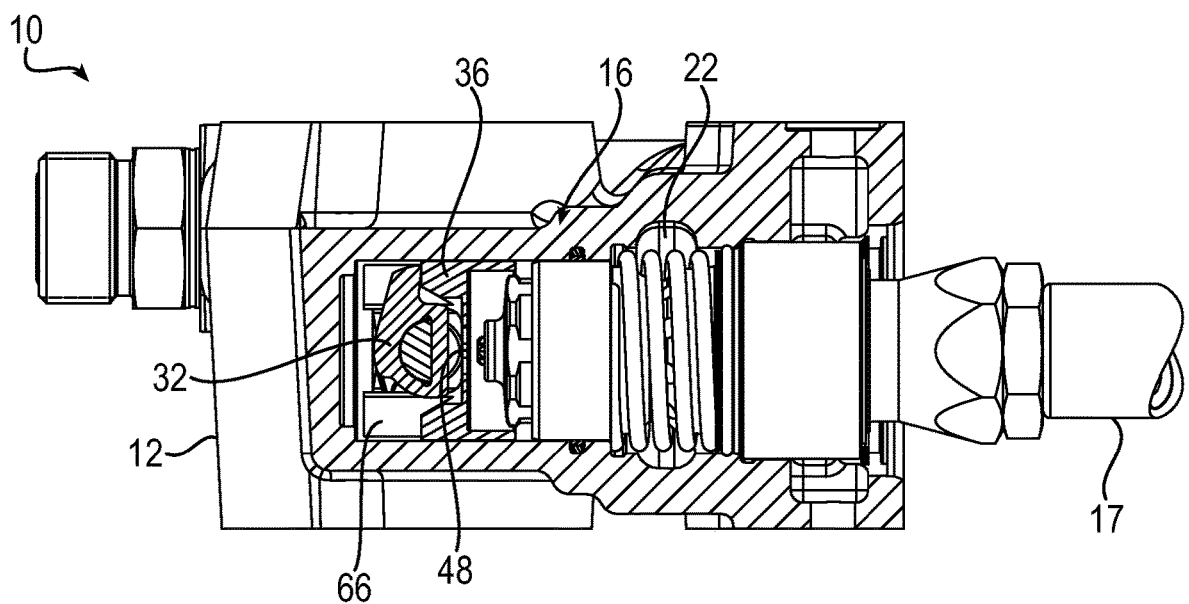

Referring to the figures, FIGS. 5A and 5B are illustrative of a first or neutral position of the multi-coupling assembly 10, similarly as in FIG. 3. Again, in the neutral position the cams 30 and 32 are positioned essentially parallel to the inner surfaces 44 of the respective stop members/cups 34 and 36. As depicted in these figures (see also FIG. 1), the housing 12 defines a pair of passageways. A first passageway (FIG. 5A) communicates with the bore 20 and is connected to, for example, the supply line; a second passageway (FIG. 5B) communicates with the second bore 22 and communicates with, for example, the return line. It will be appreciated that the supply and return lines may be interchanged. The housing 12 further defines a sump chamber 66 at the end of the bores at the housing end 18, and this sump chamber 66 can be connected to the sump of the system assembly. The shaft portion 28 of the rotational lever 24 extends through the sump chamber 66, and each cam member 30 and 32 is positioned within the sump chamber 66 for interaction between each cam member and the respective female coupling cartridge 14/16. The pressure relief valves 46 and 48 allow for the female couplers to be connectable when there is residual internal pressure as well as when there is no pressure, in that during disconnection and connection processes the pressure relief valves are operated to release any internal pressure. In the neutral position of FIGS. 5A and 5B, one or both female couplers may be connected to a male coupler for the communication of fluid through the system. In this example, the second female coupler 16 is shown connected to the male coupler 17, although both female couplers may be similarly connected to male couplers. In this manner, the neutral position corresponds to the connected position referenced above which is operable for fluid flow through the multi-coupling assembly.

Figure 6A:
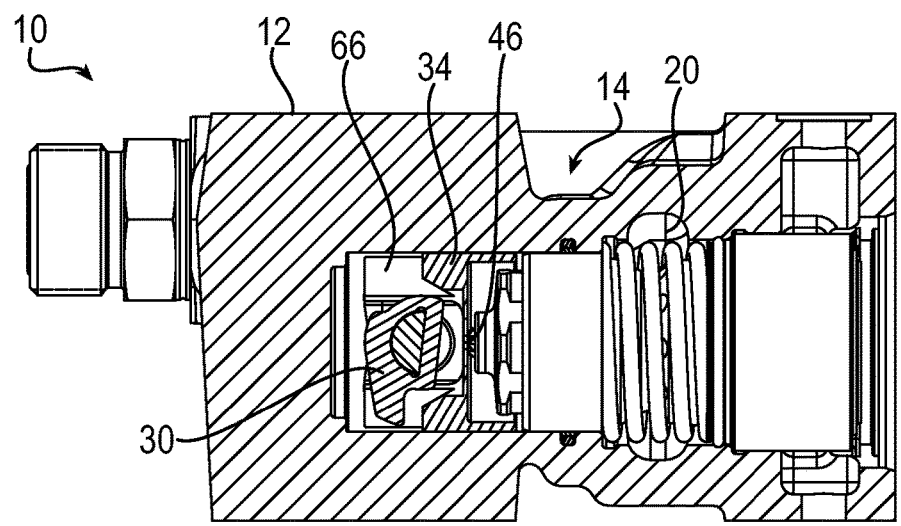
FIG. 6A and FIG. 6B are drawings depicting cross-sectional views of the exemplary multi-coupling assembly in different planes corresponding to the first female coupler and the second female coupler, with the multi-coupling assembly in a second position different from the neutral position.
Figure 6B:
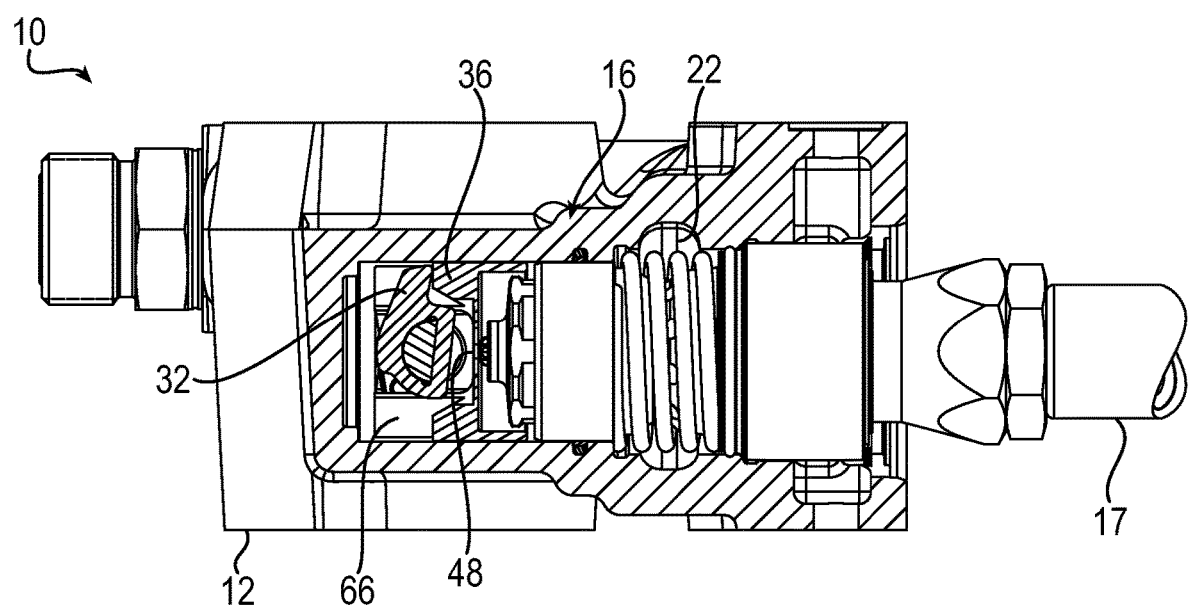

In the following operational example, the rotational lever 24 is rotated clockwise. FIGS. 6A and 6B depict the multi-coupling assembly 10 in a second position different from the neutral position in which the rotational lever 24 has been rotated away from the neutral position. With initial clockwise rotation of the rotational lever 24, the rotation is in a direction toward placing the second female coupler 16 in the release position. In particular, the clockwise directional rotation causes the second cam 32 to rotate on the rotational axis of the shaft portion 28 of the rotational lever 24, whereby the second cam 32 interacts against the second stop member 36. This interaction operates to push on the second stop member 36 in a translational direction along the bore 22, while the opposite first cam 30 rotates away from the first stop member 34 of the first female coupler 14. Accordingly, the rotational lever 24 with the two cams is acting on only one of the two female coupling cartridges at a time.

Figure 7A:
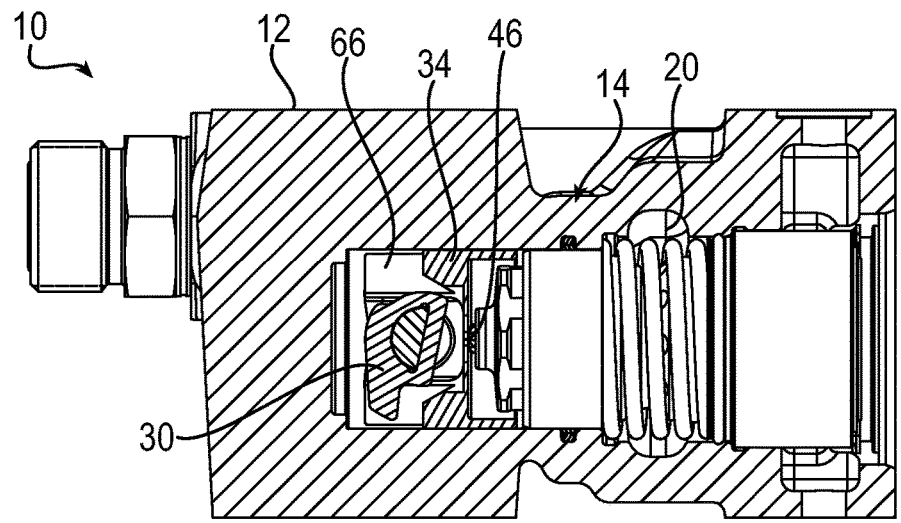
FIG. 7A and FIG. 7B are drawings depicting cross-sectional views of the exemplary multi-coupling assembly in different planes corresponding to the first female coupler and the second female coupler, with the multi-coupling assembly in a third position further different from the neutral position.
Figure 7B:
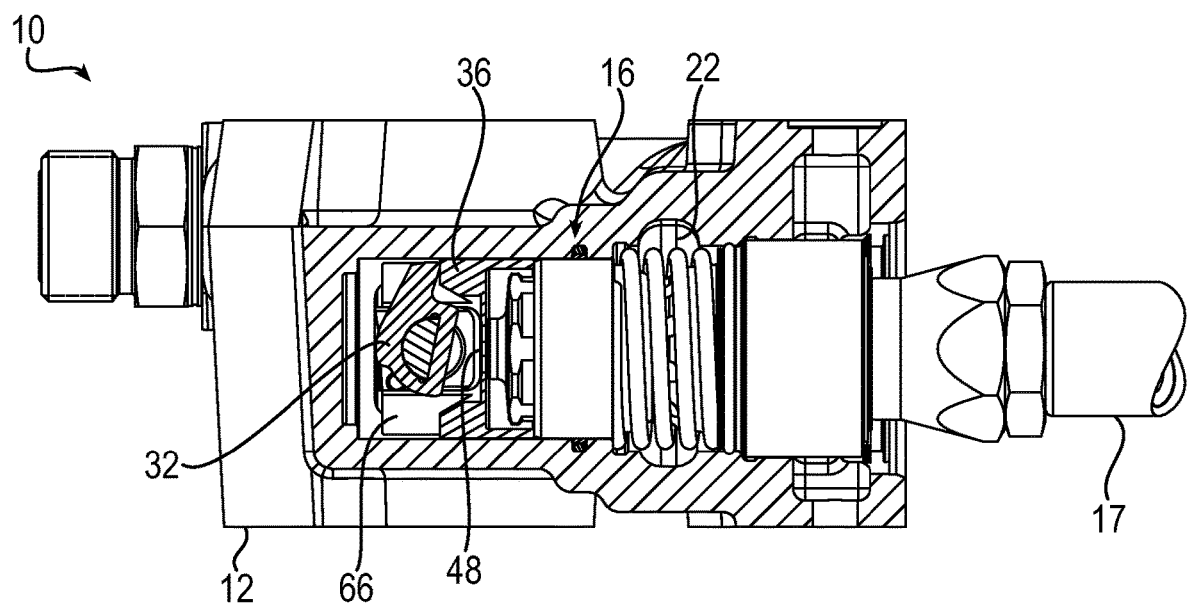

FIGS. 7A and 7B depict the multi-coupling assembly 10 in a third position further different from the neutral position relative to FIGS. 6A and 6B, i.e., the rotational lever 24 is continuing to be rotated clockwise further away from the neutral position. Additional clockwise rotation of the rotational lever 24 rotates the second cam 34 into a position in which the second cam 34 is pushing the second stop member/cup 36 against the second pressure relief valve 48, such that the second cup 36 is acting on the second pressure relief valve 48. In this position, the second pressure relief valve 48 is forced open and allows the release of internal pressure within the second female coupler 16 into the sump chamber 66 at the end of the system assembly adjacent to the shaft portion 28. This has an advantage in that pressure is released about the second female coupler prior to the actual disconnection of the male coupler. In addition, the opposite first cam 30 continues to rotate away from the first stop member 34 of the first female coupler 14. Accordingly, pressure is released from the second female coupler 16 without affecting the connection state of the first female coupler 14.

Figure 8A:
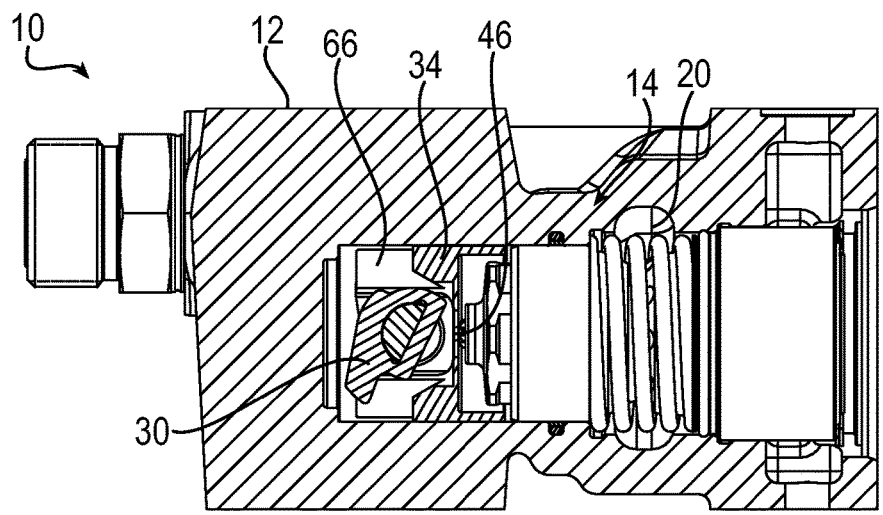
FIG. 8A and FIG. 8B are drawings depicting cross-sectional views of the exemplary multi-coupling assembly in different planes corresponding to the first female coupler and the second female coupler, with the multi-coupling assembly in a fourth position in which one of the female couplers is in a release position.
Figure 8B:
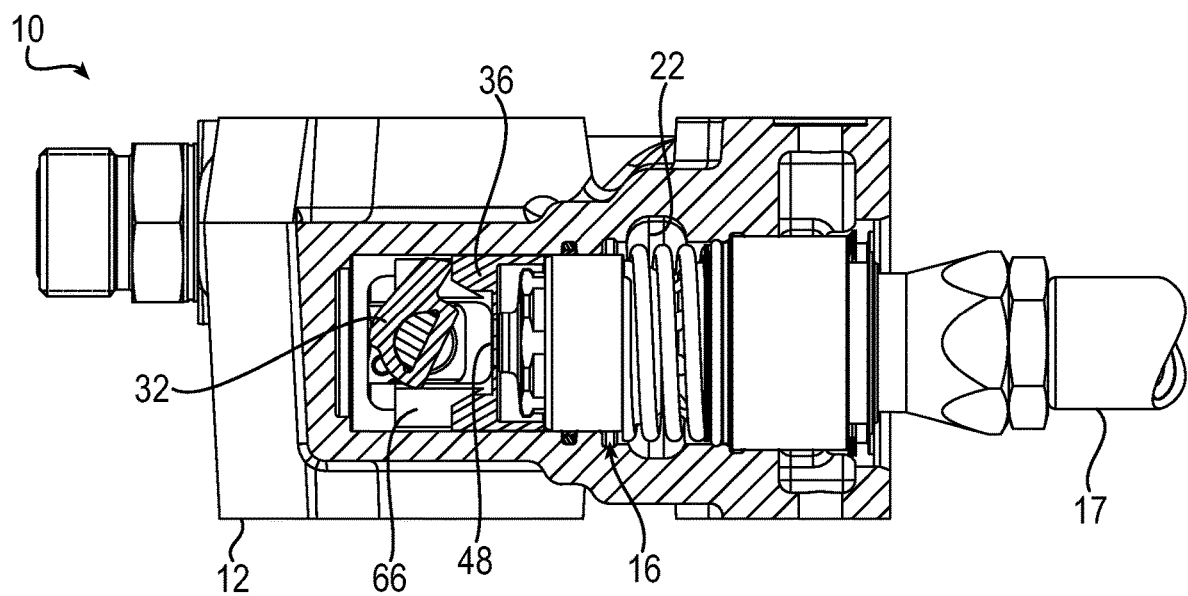

FIGS. 8A and 8B depict the multi-coupling assembly 10 in a fourth position further different from the neutral position relative to FIGS. 7A and 7B, and corresponding to the release position, i.e., the rotational lever 24 is continuing to be rotated clockwise further away from the neutral position until the second female coupler 16 is in the release position. The additional rotation of the rotational lever 24 further rotates the second cam 36 into a position in which the further rotation is translated by cam 36 into axial movement of the second female coupler 16 to the release position. With the internal pressure within in the second female coupler having been previously released as described above, the male coupler can now be disconnected safely from the female coupler. Again, the opposite first cam 30 continues to rotate away from the first stop member 34 of the first female coupler 14. Accordingly, the male coupler can be released from the second female coupler 16 without affecting the connection state of the first female coupler 14.

In the above example, a clockwise rotation of the rotational lever 24 operates to move the second female coupler 16 from the connected position to the release position without affecting the connection state of the first female coupler 14. In comparable fashion, an opposite direction or counter-clockwise rotation of the rotational lever 24 operates to move the first female coupler 14 from the connected position to the release position without affecting the connection state of the second female coupler 16. Accordingly, rotation in the first and second opposite directions allows for release of one of the female coupling cartridges while the connection state of the other female coupling cartridge is not affected, thereby accomplishing independent release positions using a single rotational lever rotating about a single rotational axis. While one cam is rotating forward on the rotational axis of the shaft portion of the rotational lever to interact against the respective stop member, the other cam is rotating away from the other female coupling cartridge allowing for the multi-coupling assembly 10 to be in the release position for only one of the two female coupling cartridges 14 or 16 at a time. Accordingly, the multi-coupling assembly 10 achieves the advantages of the previous Marquis see-saw design using a more compact configuration that utilizes a single rotational lever rotating about a single rotational axis, with internal pressure release prior to disconnection of the male coupler.

Figure 9A:
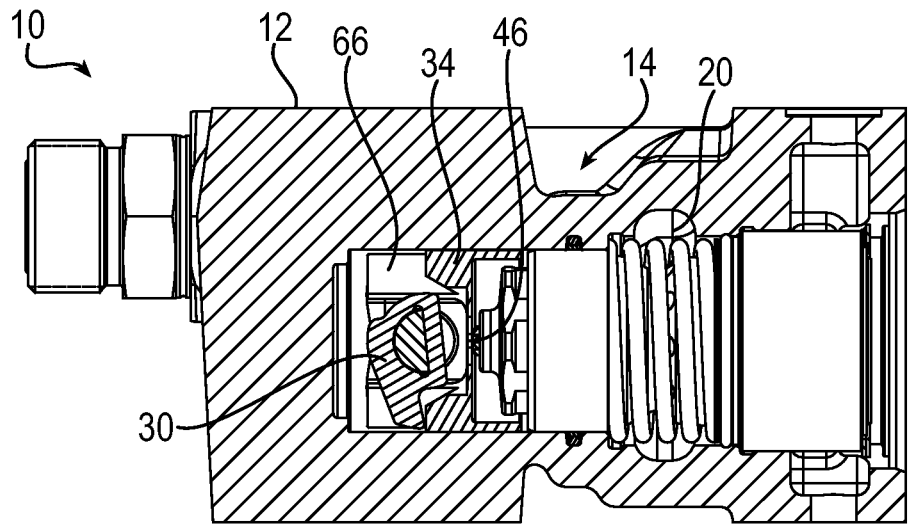
FIG. 9A and FIG. 9B are drawings depicting cross-sectional views of the exemplary multi-coupling assembly in different planes corresponding to the first female coupler and the second female coupler, illustrating a connection process for the multi-coupling assembly.
Figure 9B:
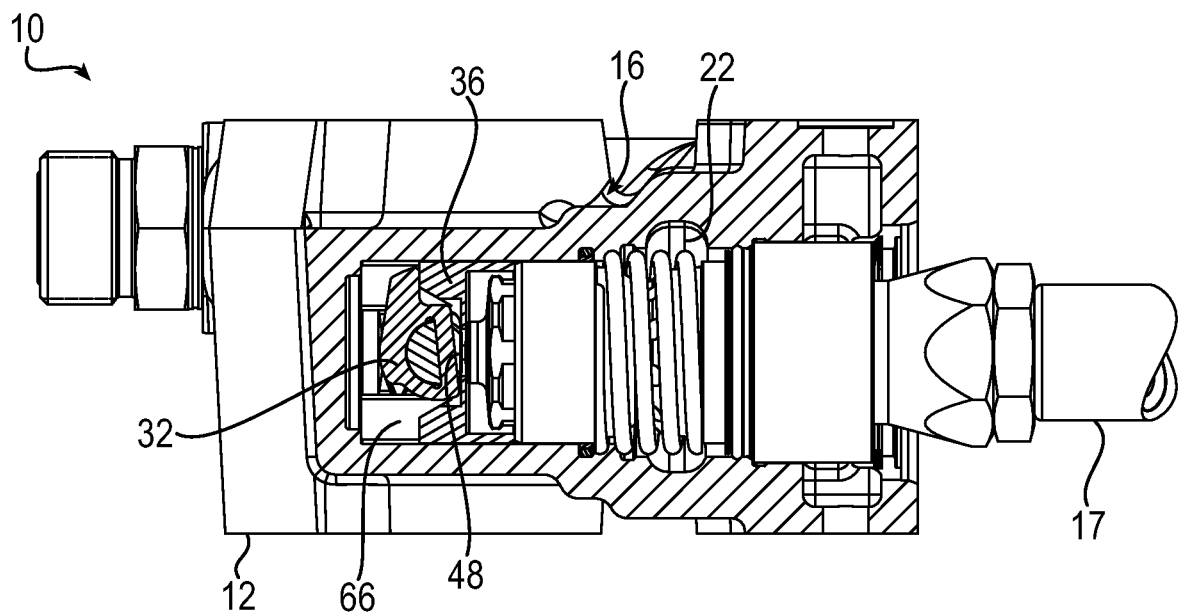

In a comparable manner, internal pressure release can be performed during connection of a male coupler to one of the female couplers, without affecting the connection state of the other female couplers. FIGS. 9A and 9B are drawings depicting the multi-coupling assembly 10 showing operation during a connection process. In this example, the male coupler 17 is being connected to the second female coupler 16, somewhat as the reverse process of FIGS. 5A/5B to 8A/8B. As the second female coupling cartridge 16 is moved from the release position back toward the connected position by insertion of the male coupler 17, the second pressure relief valve 48 is opened by interaction against the second cup 36, and the second cam 32 rotates away from the second cup 36 while the second pressure relief valve 48 is held open by the second cup 36. As this occurs, a connection state of first female coupling cartridge 14 is not affected, as the first cam 30 and the first cup 34 do not engage the first female coupler 14 on that side. A comparable operation occurs when a male coupler is connected to the first female coupler 14. As the first female cartridge coupling 16 is moved from the release position back toward the connected position by insertion of a male coupler, the first pressure relief valve 46 is opened by interaction against the first cup 34, and the first cam 30 rotates rotate away from the first cup 34 while the first pressure relief valve 46 is held open by the first cup 34. As this occurs, a connection state of second female coupling cartridge 16 is not affected, as the second cam 32 and the second cup 36 do not engage the second female coupler 16 on that side.

Figure 10:
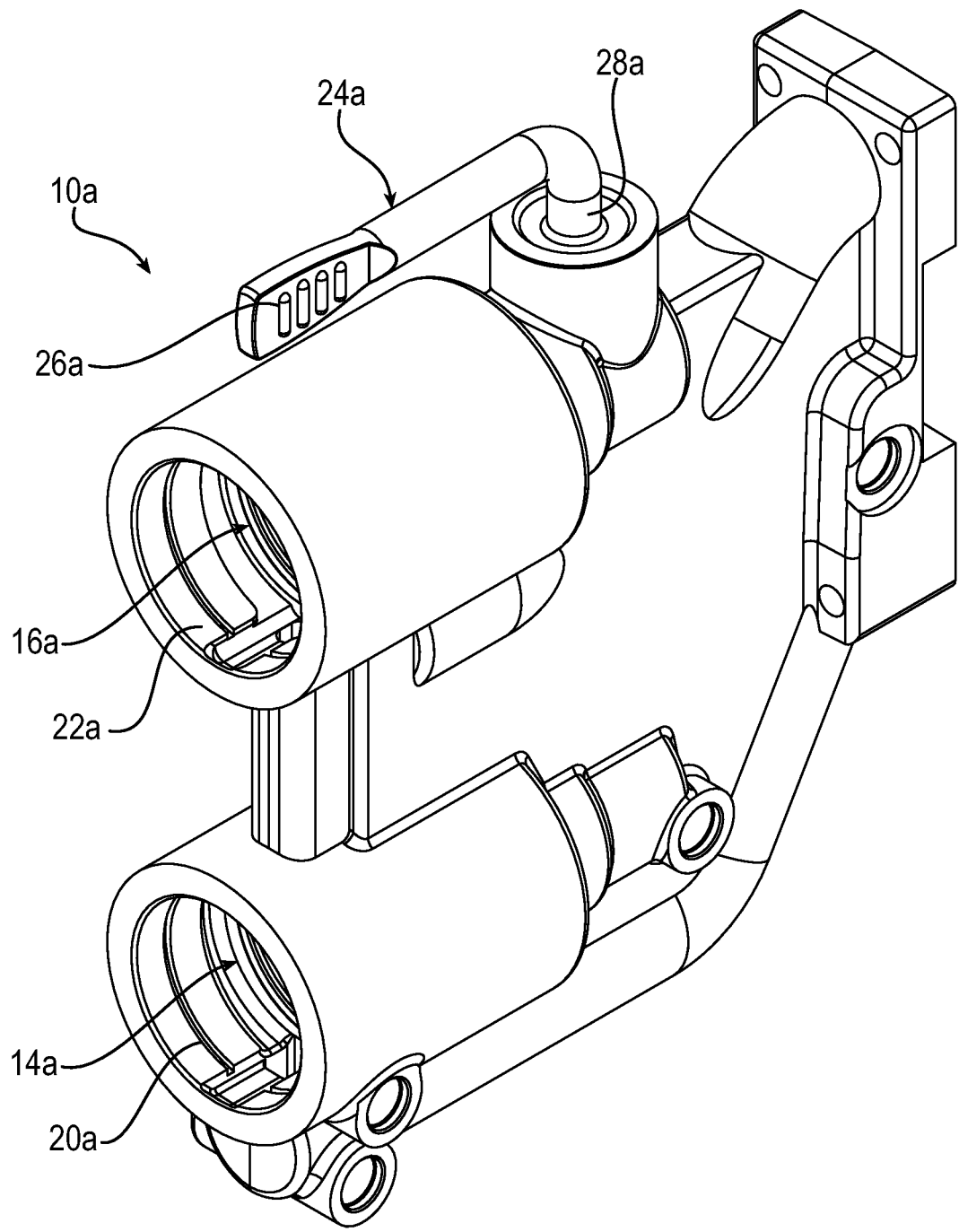
FIG. 10 is a drawing depicting a perspective view of another configuration of the exemplary multi-coupling assembly, the multi-coupling assembly having a vertical coupling design.

In the example described above, the multi-coupling 10 has a horizontal coupling design with a horizontal arrangement of the female couplers. FIG. 10 is a drawing depicting a perspective view of another configuration of the exemplary multi-coupling assembly 10a, the multi-coupling assembly 10a having a vertical coupling design with a vertical arrangement of the female couplers.

In particular, the multi-coupling assembly 10a includes a first female coupler 14a and a second female coupler 16a arranged vertically relative to each other within a housing 12a. The female couplers respectively are located within the housing 12a within respective stepped bores 20a and 22a, and likewise the female couplers are moveable within the stepped bores between a first position in which the female couplers are connected to the male couplers in a state the permits fluid flow through the system (also referred to herein as the connected position), and a second position in which the female couplers are in a state that permits releasing a male coupler from a female coupler (also referred to herein as the release position). The female couplers are moved from the connected position to the release position by operation of a rotational lever 24a. The rotational lever 24a has a handle portion 26a that is operable by a user to rotate the rotational lever, and a shaft portion 28a that extends into the housing 12a.

The internal configuration and operation otherwise is comparable to the horizontal coupling design. The rotation of the rotational lever 24a has an axis of rotation that is perpendicular to an axis of the first and second female couplers, and the rotational lever extends parallel to a plane created by the two axes of the first and second female couplers. The rotational lever 24a of the multi-coupling assembly 10a also is operable to independently disconnect a male coupler from a female coupler while the other female coupler remains in the connected state with another male coupler. In addition, pressure build-up within the female coupler that is being disconnected is released when the female coupler is moved toward the release position, prior to the actual removal of the male coupler, by operating a pressure relief valve. Likewise, pressure build-up within the female coupler also is released by during connection of the male coupler to the female coupler before the female coupler reaches the final connected position.

As aspect of the invention, therefore, is an enhanced multi-coupling assembly for a multi-line connection having multiple individual quick couplings, that allows for independent disconnection of a male coupler when the female couplers are used in a plural mounted housing assembly. In exemplary embodiments, a multi-coupling assembly includes a housing, and a first female coupler and a second female coupler that are housed within the housing. Each of the first female coupler and the second female coupler are moveable between a coupling position in which a female coupler is connectable to a respective male coupler to permit a flow of fluid through the multi-coupling assembly, and a release position in which the male coupler is releasable from a respective female coupler. A rotational lever has a handle portion that is external from the housing and a shaft portion that extends from the handle portion into the housing. Rotation of the rotational lever moves one of the female couplers from the coupling position to the release position without affecting a connection state of the other of the female couplers. The multi-coupling assembly may include one or more of the following features, either individually or in combination.

In an exemplary embodiment of the multi-coupling assembly, the assembly further includes a first cam located on the shaft portion of the rotational lever adjacent to the first female coupler, and a second cam located on the shaft portion of the rotational lever adjacent to the second female coupler; wherein rotation of the rotational lever rotates the first cam to interact against the first female coupler to move the first female coupler from the coupling position to the release position, and rotates the second cam to interact against the second female coupler to move the second female coupler from the coupling position to the release position; and wherein the cams are configured such that rotation of the rotational lever moves one of the female couplers from the coupling position to the release position without affecting a connection state of the other of the female couplers.

In an exemplary embodiment of the multi-coupling assembly, the first cam and the second cam have a common shape and are oriented along the shaft portion of the rotational lever in opposing directions relative to each other.

In an exemplary embodiment of the multi-coupling assembly, when one of the cams rotates to interact against its respective female coupler, the other of the cams is positioned to not act against its respective female coupler by either not rotating or rotating away from its respective female coupler.

In an exemplary embodiment of the multi-coupling assembly, the assembly further includes a first stop member, and the first cam interacts against the first stop member to move the first female coupler from the coupling position to the release position; and a second stop member, and the second cam interacts against the second stop member to move the second female coupler from the coupling position to the release position.

In an exemplary embodiment of the multi-coupling assembly, each stop member defines spacing for receiving the shaft portion of rotational left and a respective cam.

In an exemplary embodiment of the multi-coupling assembly, each stop member comprises a plurality of posts and an inner surface that define first and second perpendicular intersecting slots, wherein the shaft portion of rotational lever extends through the first slot and a respective cam is moveably located within the second slot.

In an exemplary embodiment of the multi-coupling assembly, the first female coupler includes a first pressure relief valve, and the first stop member operates the first pressure relief valve when the first female coupler moves between the coupling position and the release position; and the second female coupler includes a second pressure relief valve, and the second stop member operates the second pressure relief valve when the second female coupler moves between the coupling position and the release position.

In an exemplary embodiment of the multi-coupling assembly, each stop member includes a coupler interaction surface that includes a pressure release feature that operates a respective pressure relief valve.

In an exemplary embodiment of the multi-coupling assembly, the housing defines a sump chamber through which the shaft portion of the rotational lever extends, and operation of the pressure relief valves releases internal pressure of a respective female coupler into the sump chamber.

In an exemplary embodiment of the multi-coupling assembly, the shaft portion of the rotational lever extends substantially perpendicularly from the handle portion.

In an exemplary embodiment of the multi-coupling assembly, an axis of rotation of the rotational lever is perpendicular to an axis of the first and second female couplers, and the axis of rotation of the rotational lever extends parallel to a plane created by the two axes of the first and second female couplers.

Another aspect of the invention is a method of operating a multi-coupling assembly that allows for independent disconnection of a male coupler when the female couplers are used in a plural mounted housing assembly. In exemplary embodiments, the method includes the steps of: providing a multi-coupling assembly according to any of the embodiments; rotating the rotational lever, wherein rotation of the rotational lever moves one of the female couplers from the coupling position to the release position without affecting a connection state of the other of the female couplers; and disconnecting a male coupler from a respective female coupler that is in the release position without affecting the connection state of the other of the female couples. The method may include one or more of the following features, either individually or in combination.

In an exemplary embodiment of the method of operating a multi-coupling assembly, the multi-coupling assembly further comprises a first cam located on the shaft portion of the rotational lever adjacent to the first female coupler, and a second cam located on the shaft portion of the rotational lever adjacent to the second female coupler; rotation of the rotational lever rotates the first cam to interact against the first female coupler to move the first female coupler from the coupling position to the release position, and rotates the second cam to interact against the second female coupler to move the second female coupler from the coupling position to the release position; and the cams are configured such that rotation of the rotational lever moves one of the female couplers from the coupling position to the release position without affecting a connection state of the other of the female couplers.

In an exemplary embodiment of the method of operating a multi-coupling assembly, when one of the cams rotates to interact against its respective female coupler, the other of the cams is positioned to not act against its respective female coupler by either not rotating or rotating away from its respective female coupler.

In an exemplary embodiment of the method of operating a multi-coupling assembly, the multi-coupling assembly includes a first pressure relief valve, and when the first female coupler moves from the coupling position toward the release position, the pressure relief valve is operated to release pressure from the first female coupler prior to the first female coupler reaching the release position; and the multi-coupling assembly includes a second pressure relief valve, and when the second female coupler moves from the coupling position toward the release position, the pressure relief valve is operated to release pressure from the second female coupler prior to the second female coupler reaching the release position.

In an exemplary embodiment of the method of operating a multi-coupling assembly, the method further includes connecting a male coupler to a respective one of the female couplers by the steps of: inserting the male coupler into the respective female coupler, wherein the insertion of the male coupler moves the respective female coupler to the coupling position without affecting the connection state of the other of the female couples; and operating the pressure relief valve of the respective female coupler to release pressure from the respective female coupler prior to the respective female coupler reaching the coupling position.

In an exemplary embodiment of the method of operating a multi-coupling assembly, the first female coupler includes a first stop member, and the first stop member operates the first pressure relief valve when the first female coupler moves between the coupling position and the release position; and the second female coupler includes a second stop member, and the second stop member operates the second pressure relief valve when the second female coupler moves between the coupling position and the release position.

In an exemplary embodiment of the method of operating a multi-coupling assembly, the housing defines a sump chamber through which the shaft portion of the rotational lever extends, and operation of the pressure relief valves releases internal pressure of a respective female coupler into the sump chamber.

In an exemplary embodiment of the method of operating a multi-coupling assembly, an axis of rotation of the rotational lever is perpendicular to an axis of the first and second female couplers, and axis of rotation of the rotational lever extends parallel to a plane created by the two axes of the first and second female couplers.

In an exemplary embodiment of the method of operating a multi-coupling assembly, the rotational lever is rotated in a first direction to move the first female coupler from the coupling position to the release position without affecting a connection state of the second female coupler; and the rotational lever is rotated in a second direction opposite from the first direction to move the second female coupler from the coupling position to the release position without affecting a connection state of the first female coupler.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-coupling assembly comprising:
   a housing;
   a first female coupler and a second female coupler that are housed within the housing;
   wherein each of the first female coupler and the second female coupler are moveable between a coupling position in which a female coupler is connectable to a respective male coupler to permit a flow of fluid through the multi-coupling assembly, and a release position in which the male coupler is releasable from a respective female coupler;
   a rotational lever having a handle portion that is external from the housing and a shaft portion that extends from the handle portion into the housing, wherein rotation of the rotational lever moves one of the female couplers from the coupling position to the release position without affecting a connection state of the other of the female couplers; and
   a first cam located on the shaft portion of the rotational lever adjacent to the first female coupler, and a second cam located on the shaft portion of the rotational lever adjacent to the second female coupler;
   wherein rotation of the rotational lever rotates the first cam to interact against the first female coupler to move the first female coupler from the coupling position to the release position, and rotates the second cam to interact against the second female coupler to move the second female coupler from the coupling position to the release position;
   wherein the cams are configured such that rotation of the rotational lever moves one of the female couplers from the coupling position to the release position without affecting a connection state of the other of the female couplers; and
   wherein an axis of rotation of the rotational lever is perpendicular to an axis of the first and second female couplers, and the axis of rotation of the rotational lever extends parallel to, or in line with, a plane created by the two axes of the first and second female couplers.

2. The multi-coupling assembly of claim 1, wherein the first cam and the second cam have a common shape and are oriented along the shaft portion of the rotational lever in opposing directions relative to each other.

3. The multi-coupling assembly of claim 2, wherein when one of the cams rotates to interact against its respective female coupler, the other of the cams is positioned to not act against its respective female coupler by either not rotating or rotating away from its respective female coupler.

4. The multi-coupling assembly of claim 1, further comprising:
   a first stop member, and the first cam interacts against the first stop member to move the first female coupler from the coupling position to the release position; and
   a second stop member, and the second cam interacts against the second stop member to move the second female coupler from the coupling position to the release position.

5. The multi-coupling assembly of claim 4, wherein each stop member defines spacing for receiving the shaft portion of rotational lever and a respective cam.

6. The multi-coupling assembly of claim 5, wherein each stop member comprises a plurality of posts and an inner surface that define first and second perpendicular intersecting slots, wherein the shaft portion of the rotational lever extends through the first slot and a respective cam is moveably located within the second slot.

7. The multi-coupling assembly of claim 4, wherein:
   the first female coupler includes a first pressure relief valve, and the first stop member operates the first pressure relief valve when the first female coupler moves between the coupling position and the release position; and
   the second female coupler includes a second pressure relief valve, and the second stop member operates the second pressure relief valve when the second female coupler moves between the coupling position and the release position.

8. The multi-coupling assembly of claim 7, wherein each stop member includes a coupler interaction surface that includes a pressure release feature that operates a respective pressure relief valve.

9. The multi-coupling assembly of claim 7, wherein the housing defines a sump chamber through which the shaft portion of the rotational lever extends, and operation of the pressure relief valves releases internal pressure of a respective female coupler into the sump chamber.

10. The multi-coupling assembly of claim 1, wherein the shaft portion of the rotational lever extends substantially perpendicularly from the handle portion.

11. A multi-coupling assembly comprising:
    a housing;
    a first female coupler and a second female coupler that are housed within the housing;
    wherein each of the first female coupler and the second female coupler is moveable between a coupling position in which one of the female couplers is connectable to a respective male coupler to permit a flow of fluid through the multi- coupling assembly, and a release position in which the male coupler is releasable from the female coupler;
    a rotational lever having a handle portion that is external from the housing and a shaft portion that extends from the handle portion into the housing, wherein rotation of the rotational lever moves one of the female couplers from the coupling position to the release position without affecting a connection state of the other of the female couplers;
    a first cam located on the shaft portion of the rotational lever adjacent to the first female coupler, and a second cam located on the shaft portion of the rotational lever adjacent to the second female coupler;
    a first stop member, and the first cam interacts against the first stop member to move the first female coupler from the coupling position to the release position, and a second stop member, and the second cam interacts against the second stop member to move the second female coupler from the coupling position to the release position;

wherein each stop member defines spacing for receiving the shaft portion of rotational lever and a respective cam;

wherein each stop member comprises a plurality of posts and an inner surface that define first and second perpendicular intersecting slots, wherein the shaft portion of the rotational lever extends through the first slot and a respective cam is moveably located within the second slot;

wherein rotation of the rotational lever rotates the first cam to interact against the first female coupler to move the first female coupler from the coupling position to the release position, and rotates the second cam to interact against the second female coupler to move the second female coupler from the coupling position to the release position; and wherein the first and second cams are configured such that rotation of the rotational lever moves one of the female couplers from the coupling position to the release position without affecting a connection state of the other of the female couplers.

12. A multi-coupling assembly comprising:

a housing;

a first female coupler and a second female coupler that are housed within the housing;

wherein each of the first female coupler and the second female coupler is moveable between a coupling position in which one of the female couplers is connectable to a respective male coupler to permit a flow of fluid through the multi-coupling assembly, and a release position in which the male coupler is releasable from the female coupler;

a rotational lever having a handle portion that is external from the housing and a shaft portion that extends from the handle portion into the housing, wherein rotation of the rotational lever moves one of the female couplers from the coupling position to the release position without affecting a connection state of the other of the female couplers;

a first cam located on the shaft portion of the rotational lever adjacent to the first female coupler, and a second cam located on the shaft portion of the rotational lever adjacent to the second female coupler;

wherein rotation of the rotational lever rotates the first cam to interact against the first female coupler to move the first female coupler from the coupling position to the release position, and rotates the second cam to interact against the second female coupler to move the second female coupler from the coupling position to the release position; and wherein the cams are configured such that rotation of the rotational lever moves one of the female couplers from the coupling position to the release position without affecting a connection state of the other of the female couplers, such that when one of the first or second cams rotates to interact against its respective female coupler, the other of the first or second cams is positioned to not act to move its respective female coupler by rotating away from its respective female coupler.

* * * * *